Feb. 28, 1950 N. V. PETERSON 2,499,279

SINGLE SIDE BAND MODULATOR

Filed April 14, 1948

INVENTOR
NILS VILHELM PETERSON

BY Leech & Radue

ATTORNEYS

Patented Feb. 28, 1950 2,499,279

UNITED STATES PATENT OFFICE 2,499,279

SINGLE SIDE BAND MODULATOR

Nils Vilhelm Peterson, Stockholm, Sweden, assignor to Telefonaktiebolaget L M Ericsson, Stockholm, Sweden, a company of Sweden Application April 14, 1948, Serial No. 20,908
In Sweden April 22, 1947

3 Claims. (Cl. 332—41)

When modulating frequency bands with a large relative width, as for instance program channels, where often frequencies down to 30 p./s. and up to about 10,000 p./s. have to be transmitted, it may be difficult to cut away that part of the undesired band which corresponds to the lowest frequencies in the original band. If the undesired side band is unsatisfactorily suppressed in relation to the desired side band currents from the undesired side band will be mixed with currents from the desired side band after the demodulation. The resulting current will then be dependent on the phase shift of the two partial currents, said shift in its turn being dependent on the circuits between modulator and demodulator.

One method for producing a steep cut-off of the undesired side band is to use crystal filters. Such filters are however not very convenient to use as they obtain a very high characteristic. It is therefore often necessary to arrange them between two electron tube stages.

The invention relates to a modulation device more closely described below in connection with the attached drawing, in which the desired steep cut-off is obtained by means of filters consisting of ordinary filter elements.

Figure 1:
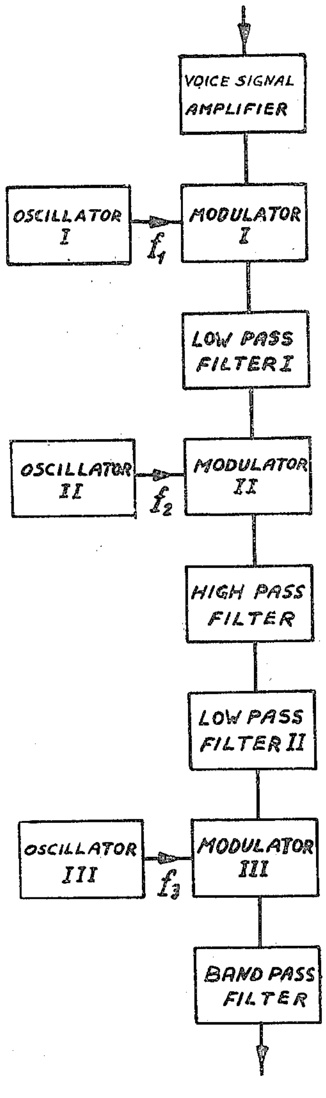
Figure 2:
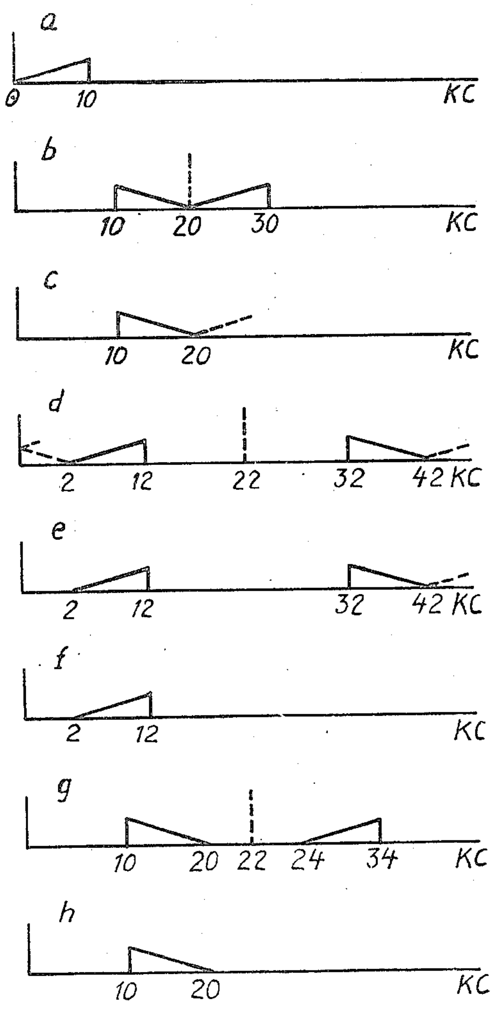

Fig. 1 is a block diagram illustrating the general make-up of the novel modulation device and Fig. 2 is a graphical representation illustrative of the operation of this device showing a number of frequency diagrams.

The original voice signal band (0–10 kc., Fig. 2*a*) is amplified in the voice signal amplifier and modulated from oscillator I in modulator I with a frequency $f_1$ (20 kc. Fig. 2*b*). The frequency band to be transmitted is represented by a triangle to make it possible to see in the diagrams of Fig. 2 which part of the frequency band corresponds to the lower tones in the transmitted band and which corresponds to the higher ones. Thus two side bands are obtained as shown in Fig. 2*b*. An effective cut-off of one side band without too much attenuation of parts of the other band would now require very expensive and complicated filters. According to the invention such complicated filters are avoided through the following procedure: The undesired side band (20–30 kc.) is suppressed partially in a low pass filter I, Fig. 1, which attenuates the upper one as seen at C, Fig. 2.

Modulation then takes place in a modulator II with a carrier frequency $f_2$, say 22 kc. from oscillator II, which differs from the carrier frequency $f_1$ a certain amount ($f_2$—$f_1$) and which lies relatively close to frequency $f_1$ on the same side as the suppressed band, whereby two side bands according to Fig. 2*d* are obtained (2–12 and 32–42 kc.). Those currents in the desired side band which correspond to the lowest frequencies in the original band (0–10 kc.), may then easily be suppressed in a high pass filter having an approximate cut-off frequency ($f_2$—$f_1$), as seen in Fig. 2*e*. As in this way the sharp cut-off is accomplished at the low frequency ($f_2$—$f_1$) the filters needed for this purpose are very simple and furthermore the demand on stability of the filter elements may be considerably reduced. Another low pass filter (low pass filter II) cuts off the high-frequency band (32–52 kc.), as seen in Fig. 2*f*, which is produced in the modulator II.

By this procedure the original band (0–10 kc.) in Fig. 2*a* has been displaced upwards an amount corresponding to the frequency difference ($f_2$—$f_1$). The high pass filter and low pass filter II may of course be combined in a single band pass filter. Behind these filters there remains a frequency band (2–12 kc.), which is again displaced upwards in frequency by modulation in a modulator III with a carrier frequency $f_3$ from oscillator III (22 kc. according to Fig. 2*g*). This frequency may be the same as the carrier frequency $f_2$ or some other suitable frequency. In a relatively simple band pass filter the one side band (24–34 kc.) can now be suppressed without influencing the other one and thus the desired final band (10–20 kc.) according to Fig. 2*h* is obtained.

I claim:

1. A wave transmission system comprising in combination a source of voice signal frequencies, a source of carrier frequency oscillation, the frequency $f_1$ of which is high relative to the voice signal frequencies, a modulating device in which said voice signal is impressed on said carrier frequency, a filter connected with the output of said modulating device for partial suppression of one of the side bands, a source of a second carrier frequency oscillation, the frequency $f_2$ of which differs from the frequency $f_1$ of the first mentioned carrier frequency by an amount less than the highest voice signal frequency to be transmitted and falling within the frequency range of the partially suppressed side band, a second modulating device in which the unsuppressed side band and said partially suppressed side band are impressed on said second carrier frequency, a high pass filter with a cut-off frequency of ($f_2$—$f_1$) connected with the output of said second modulating device and a low pass filter in series with said high pass filter for selecting the lower side band, a source of a third carrier frequency oscillation, a third modulator for impressing said selected lower side band on said third carrier frequency, and a band pass filter for selecting one of the resulting side bands.

2. A device as claimed in claim 1 comprising an oscillation source which is common to one of said intermediate carrier frequency oscillators and said last mentioned carrier frequency.

3. A wave transmission system comprising in combination a source of wide band audio signal frequencies, a source of carrier voltage the frequency $f_1$ of which is of the order of twice the maximum signal frequency, a modulating device for combining said frequencies, a low pass filter arranged to partially suppress the upper side band from said device, a second source of carrier voltage the frequency $f_2$ of which exceeds that of $f_1$ by less than the highest frequency of the original signal, a second modulating device for combining the now filtered frequencies and the second carrier, a high pass filter having a cut-off frequency of substantially $f_2-f_1$ connected to the output of the second modulator to eliminate those frequencies in the lower side band which correspond to the lowest frequencies in the original signal band, a low pass filter following said high pass filter to eliminate the upper side band, a third source of carrier frequency, a third modulator to combine the filtered lower side band and the third carrier, and a band-pass filter in the output of the third modulator to select its lower side band.

NILS VILHELM PETERSON.

REFERENCES CITED

The following references are of record in the file of this patent:

UNITED STATES PATENTS

| Number | Name | Date |
|---|---|---|
| 1,361,488 | Osborne | Dec. 7, 1920 |
| 1,624,498 | Mohr | Apr. 13, 1927 |
| 2,095,050 | Beverage | Oct. 5, 1937 |